Figure 1:
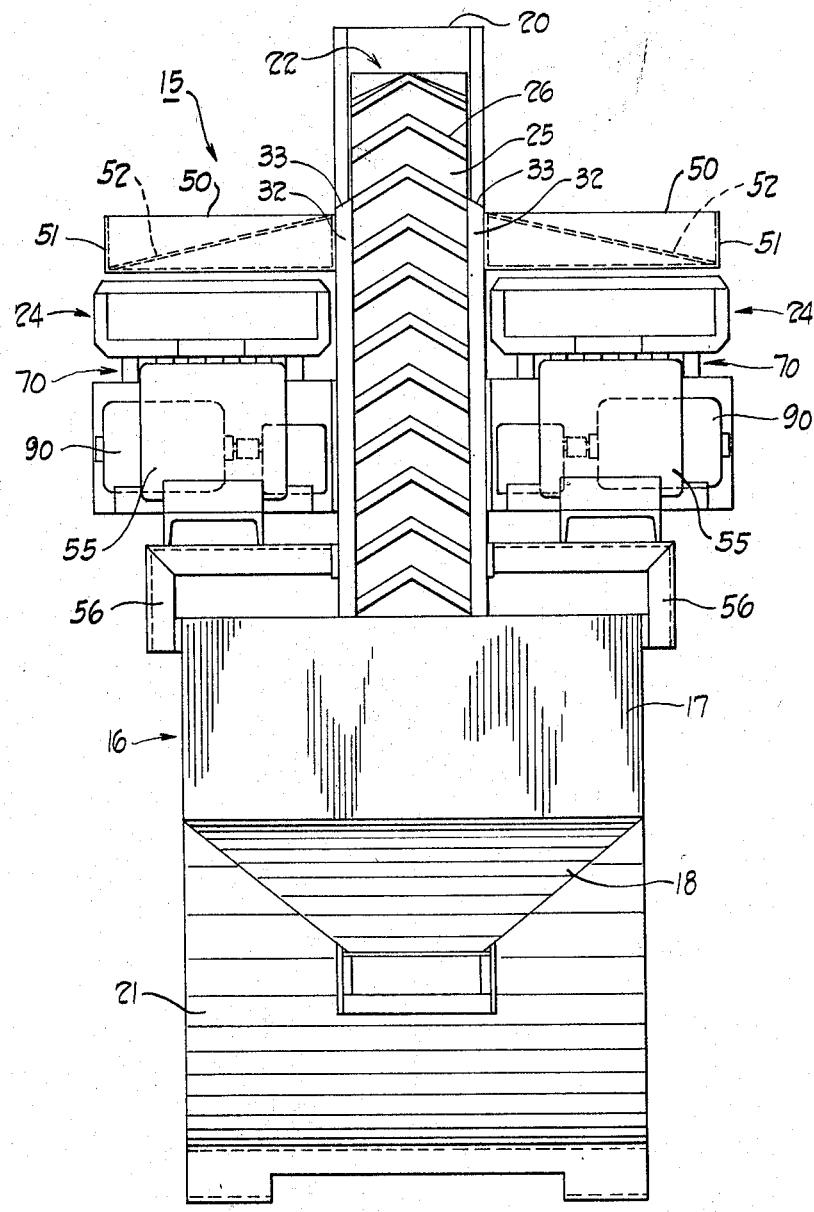

Nov. 1, 1966  R. H. CROTTY  3,282,395
WORK FEEDING APPARATUS
Filed Nov. 5, 1964  5 Sheets-Sheet 1

INVENTOR.
RICHARD H. CROTTY
BY *Watts & Fisher*
ATTORNEYS.

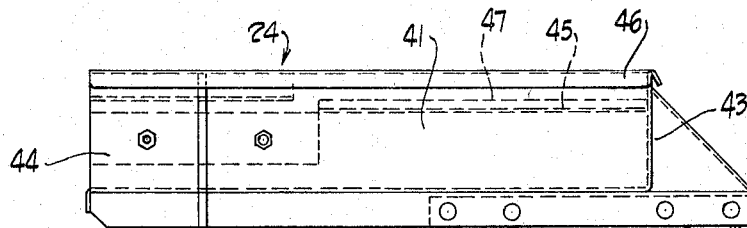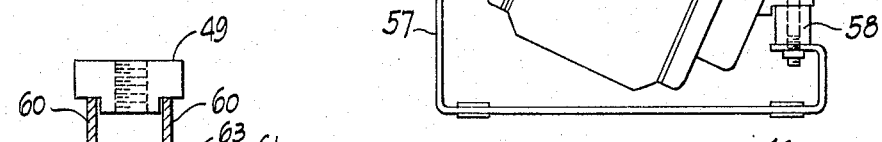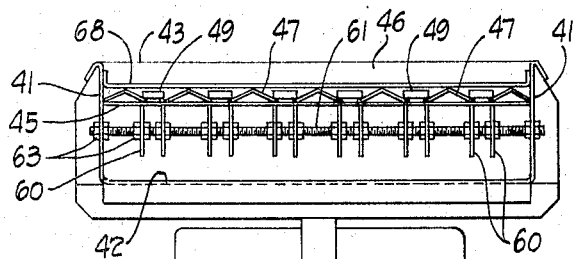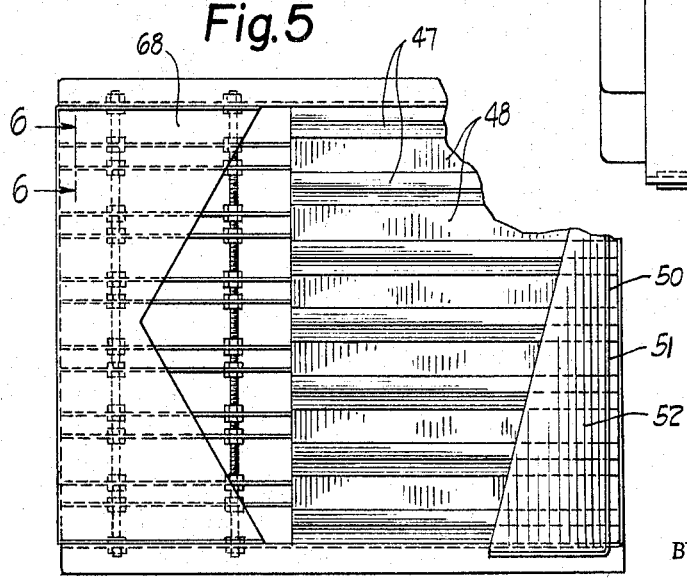

Nov. 1, 1966   R. H. CROTTY   3,282,395
WORK FEEDING APPARATUS
Filed Nov. 5, 1964   5 Sheets-Sheet 4

INVENTOR.
RICHARD H. CROTTY
BY *Watts & Fisher*
ATTORNEYS.

INVENTOR.
RICHARD H. CROTTY
BY Watts & Fisher
ATTORNEYS

United States Patent Office 3,282,395
Patented Nov. 1, 1966

3,282,395
WORK FEEDING APPARATUS
Richard H. Crotty, Mentor, Ohio, assignor to
Production Feeder Corporation
Filed Nov. 5, 1964, Ser. No. 409,093
13 Claims. (Cl. 198—33)

This invention relates generally to the work handling art, and more specifically to apparatus and methods for aligning articles used in a variety of manufacturing operations and feeding the aligned articles to desired locations, such as to presses, welding apparatus, or other work machines.

The invention is particularly concerned with the orientation and feeding of relatively small articles, such as clinch nuts, screws, rivets, and the like. Articles of this nature are customarily supplied to automatic work machines from bins or hoppers. In supplying such articles, it is necessary to orient them in the manner required by the work machines, and to feed the articles in a continuous stream.

It has been conventional to feed articles such as clinch nuts by means of pin feeders comprising a wheel or disc with a plurality of spring pressed, radially projecting pins. The wheel has been mounted adjacent a track so that pins can protrude into the tapped holes of the clinch nuts and thereby push the nuts along the track when the wheel is rotated. This type of pin feeder apparatus had the disadvantage that the pins would engage and damage the threads of the nuts. The tendency of the prior pin feeders to damage the threads of clinch nuts was particularly evident in instances where the feeders were depended upon to push the combined weight of a long row of nuts. Another disadvantage was that the conventional pin feeders were not suitable for elevating the clinch nuts or other articles so that they could be gravity fed into the work machines. Thus, when a gravity feed was desired, it was necessary to provide a separate elevating mechanism in addition to the pin feeder, and this added to the cost and complexity of the entire apparatus.

The present invention provides new and improved feeding apparatus which is operable continuously to transfer small articles of the type described from bins or hoppers and to orient the articles in such a manner that they can be introduced into a work machine. The apparatus is preferably constructed simultaneously to supply a plurality of work machines. As will be made apparent, the preferred construction of the new feeding and orienting apparatus is relatively simple and yet is capable of operating at the high production rates required in modern manufacturing operations.

Another important feature of the invention resides in the structure for feeding articles such as clinch nuts without damage. The preferred feeding mechanism which is contemplated comprises a magnetic drive wheel mounted in association with a guide member on which a row of oriented articles is slidably supported. Actuation of the drive wheel serves to move the articles along the guide member at the rate required by the associated work machine. Since the new magnetic feeding mechanism does not engage the tapped holes of clinch nuts, the problem of damaging the threads has been overcome.

The new magnetic feeding mechanism also is suitable for elevating the articles in order that they can be gravity fed to the work machines. Thus, the invention provides a single feeding and elevating mechanism which can be used in place of the conventional pin feeder and separate elevating apparatus.

Other features and advantages of the invention will become apparent from the following detailed description when taken in conjunction with the accompanying drawings.

Figure 2:
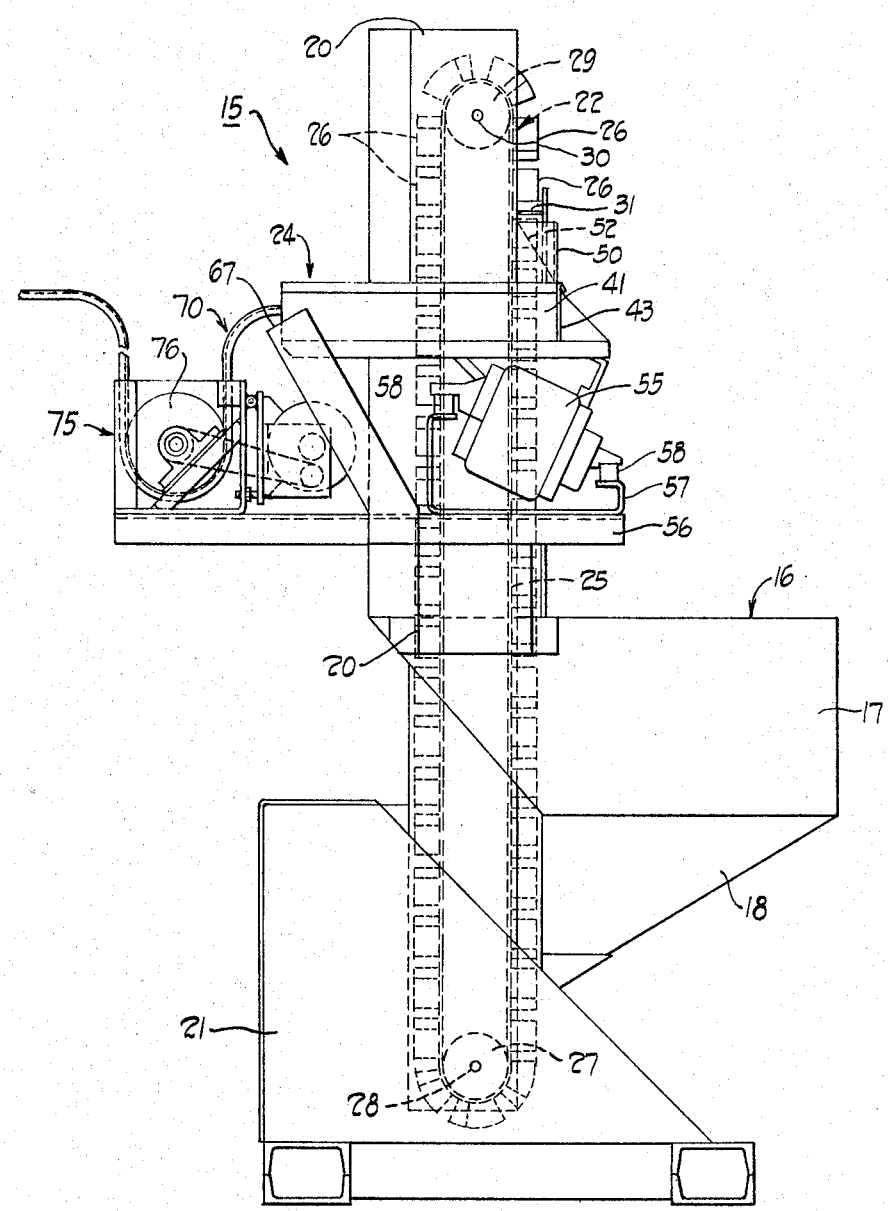
Figure 7:
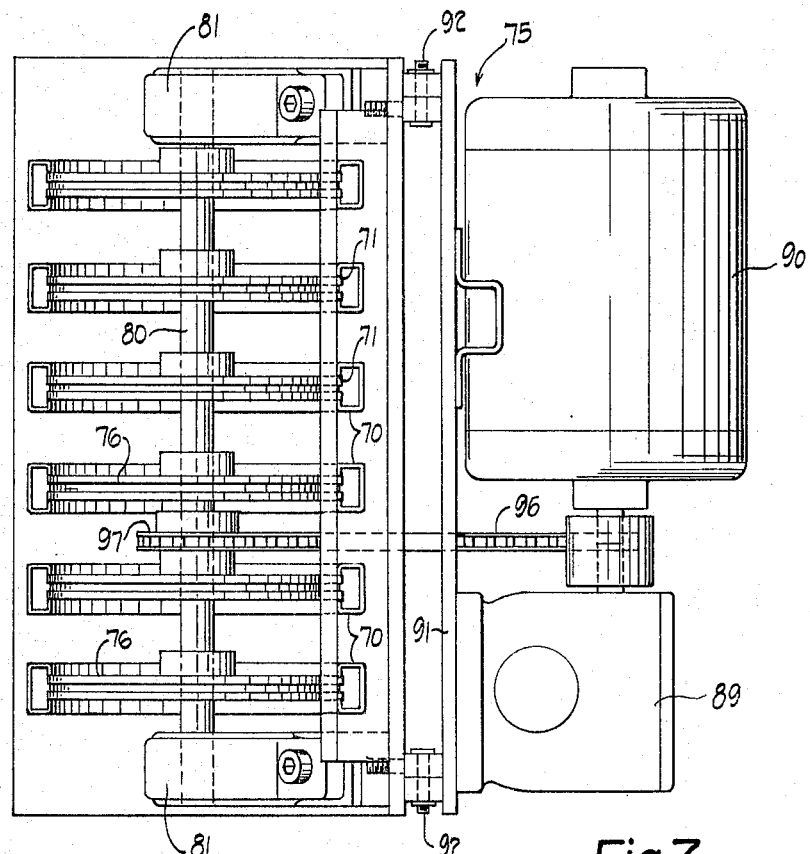
Figure 8:
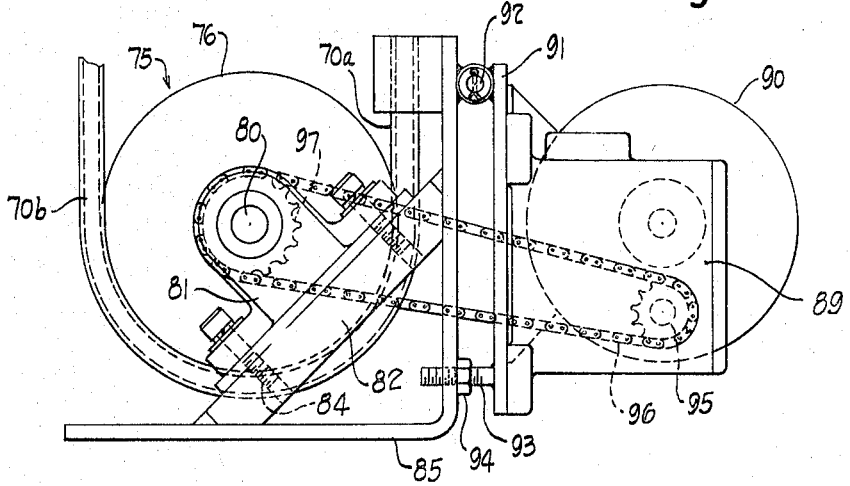
Figure 9:
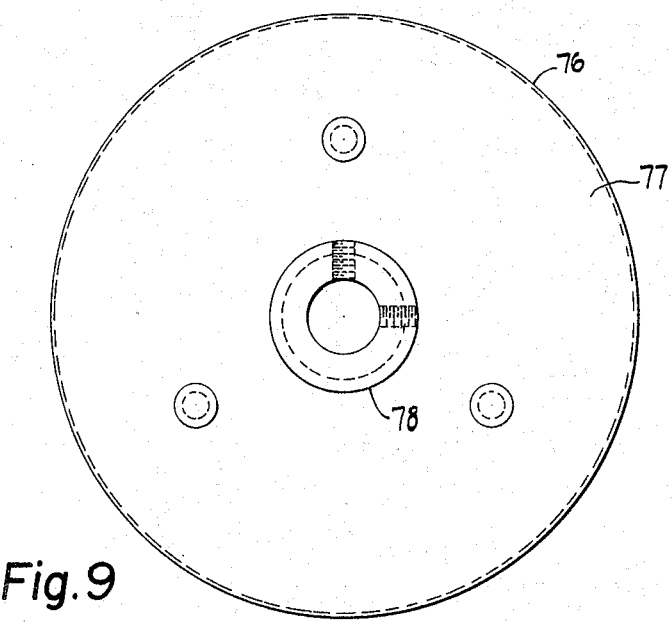
Figure 10:
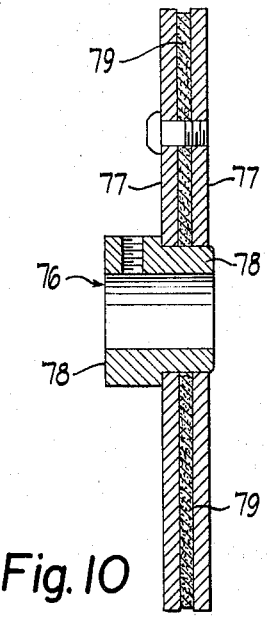
Figure 11:
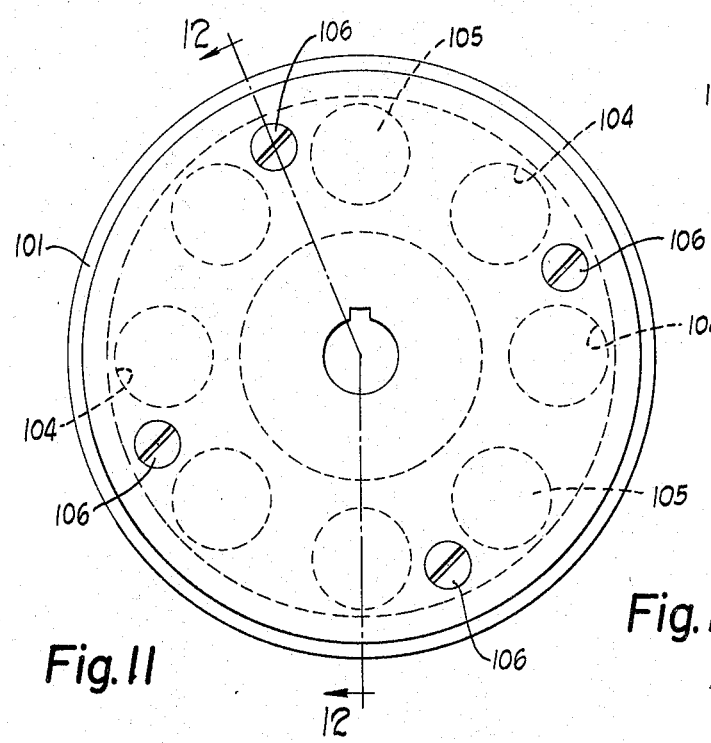
Figure 12:
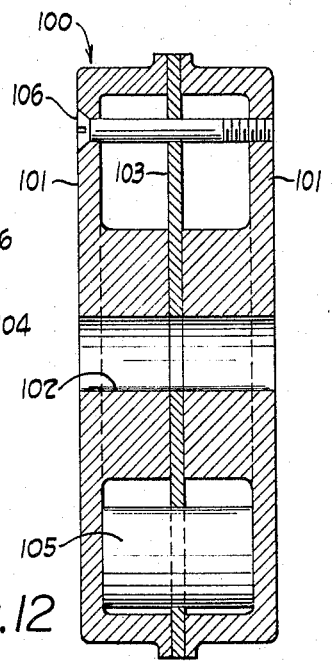

In the drawings:
FIGURE 1 is a front elevational view of a preferred embodiment of this invention;
FIGURE 2 is a side elevational view of the apparatus shown in FIGURE 1;
FIGURE 3 is a side elevational view of the article orienting mechanism;
FIGURE 4 is an end elevational view of the mechanism shown in FIGURE 3;
FIGURE 5 is a top elevational view of the orienting mechanism;
FIGURE 6 is a fragmentary, cross-sectional view taken on the line 6—6 of FIGURE 5;
FIGURE 7 is a top elevational view of another portion of the apparatus;
FIGURE 8 is a side elevational view of the preferred magnetic drive assembly of this invention;
FIGURE 9 is an elevational view of the preferred magnetic drive assembly of this invention;
FIGURE 10 is a cross-sectional view of the assembly shown in FIGURE 9;
FIGURE 11 is an elevational view of a modified magnetic drive assembly; and
FIGURE 12 is a cross-sectional view taken on the line 12—12 of FIGURE 11.

Referring now to the drawings, and to FIGS. 1 and 2 in particular, the apparatus comprising the preferred embodiment of the invention is indicated generally by reference numeral 15. The apparatus 15 includes an article-receiving hopper 16 into which articles to be oriented and fed to another location are placed by any suitable means. As shown, the hopper 16 has side walls 17 and bottom walls 18 which slope inwardly and rearwardly of the hopper.

The hopper 16 is secured to an upwardly extending tower 20. This tower is in turn supported by a base 21 which is formed by suitable structural members. The tower 20 houses an elevating or transfer mechanism 22. This elevating or transfer mechanism 22 extends upwardly through the back of the hopper 16 and is operable continuously to feed articles from the hopper to overhead orienting mechanisms 24.

In the illustrated embodiment of the invention, the elevating or transfer mechanism 22 comprises an endless conveyor belt 25 having spaced, inverted V-projections or steps 26 extending between the sides of the belt. The lower end of the belt 25 is mounted around a drum 27 which is fixed on a shaft 28. The shaft 28 is journaled in the tower 20 and is actuated by a suitable motor drive (not shown). The upper end of the belt 25 is mounted around a drum 29 which is fixed on a shaft 30. This shaft is also journaled in the tower 20.

The tower 20 includes forwardly projecting side portions 31 (FIG. 2) and integral flanges 32 behind which the outer flight of the belt 25 is positioned. The side portions 31 are adjacent the sides of the belt and terminate above the orienting mechanisms 24 at outwardly and downwardly sloping surfaces 33. With the described construction of the transfer mechanism 22, the conveyor belt 25 is actuated to move its outer flight upwardly through the hopper 16. This movement causes articles in the hopper to be carried upwardly by means of the projections or steps 26. The articles are prevented from sliding from the steps by the side portions 31 of the tower 20 until adjacent the terminating surfaces 33. At this point the articles are released to slide from the steps on both sides of the belt. It will be understood that various other article transfer or conveying mechanisms, such as a magnetic conveyor, can be used in place of the described structure 22.

Preferably, an article orienting mechanism 24 is provided at each side of the conveyor belt 25 to receive the articles transferred from the hopper 16. Each of these mechanisms 24 serves automatically to orient and align the articles into spaced rows that can be conveniently fed to associated work machines. Referring particularly to FIGURES 3–6, each article orienting mechanism is shown to compromise a fabricated construction including side walls 41, a bottom wall 42, an end wall 43, which is positioned adjacent to the conveyor belt 26, and an opposite open end 44. A wall 45 is secured between the side walls 41 above the bottom wall 42. The wall 45 terminates short of the open end 44 and defines a first portion or pan 46. The pan portion 46 of each article orienting mechanism includes spaced members 47 which are secured to the wall 45 so as to define a plurality of spaced, longitudinally extending troughs 48. As shown, the members 47 are inverted V-shaped metal strips which are secured to the wall 45. The spacing of the strips 47 is such that the articles, such as clinch nuts 49, fed into the pans 46 can be aligned in the troughs 48.

According to the preferred construction, the clinch nuts 49 or other articles elevated from the hopper 16 by the conveyor belt 25 are introduced into the pans 46 of the orienting mechanism by distributor members 50. Each of the members 50 comprises a U-shaped bracket 51 which is secured to a side of the tower 20 below the surfaces 33 of the tower side portions 32 (FIG. 1). A sloping, triangular distribution plate 52 is carried by each bracket and extends across the adjacent pan 46. The larger ends of these plates 52 are adjacent the surfaces 33 and the smaller ends extend outwardly and downwardly with respect to the sides of the tower toward the pans. As will be apparent from this description, the clinch nuts released from the conveyor steps 26 will slide along the distributor plates toward the smaller ends and will drop from plates along their entire lengths into the pans 46. In this manner, the articles are distributed substantially uniformly across the pans for orientation in the troughs 48.

Each article orienting mechanism 24 is reciprocated in the direction of the longitudinally extending troughs 48 to orientate the workpiece articles in rows in the troughs and to move the articles toward the open end 44. In order to reciprocate the orienting mechanisms, vibrators 55, which are of conventional construction, are mounted on the frames 56 extending from opposite sides of the tower 20. Each vibrator is connected to a frame 56 by means of a bracket 57 and rubber mounting blocks 58 which are mounted between the vibrator and the bracket. The fabricated constructions comprising the members 41, 42, 43 are connected directly to the vibrators by any suitable means.

The construction of each article orienting mechanism also includes a second article supporting and sorting portion for receiving the aligned articles fed from the troughs 48. As shown, this second portion of each mechanism comprises a pair of rails 60 which extend from the end of each trough 48 and are aligned therewith. The rails 60 may comprise strips of metal which are carried on threaded rods 61 between nuts 63. The rods are suitably secured between the side walls 41. With this construction, the spacing of each pair of rails 60 can be laterally adjusted by means of the nuts 63 to support articles of different sizes, as shown in FIG. 6. The spaced rails serve to sort out those articles which are not properly oriented by reciprocation in the troughs 48. Any clinch nuts which are not disposed with their shanks projecting downwardly through the rails 60 will fall into chutes 67 which are secured to the tower 20 to extend between the open ends 44 of the orienting mechanisms and the top of the hopper 16. To aid in removing articles which are not oriented in the manner illustrated in FIG. 6, there is preferably provided a wiping plate 68 which is mounted between the sides 41 of each orienting mechanism over the rails 60.

The oriented and aligned articles are moved by actuation of the vibrators 55 along the rails 60 to guide structures 70 which extend from the ends of the rails to work machines or the like. As most clearly shown in FIGS. 7 and 8, the guide structures 70 are comprised of a plurality of chutes which may be formed of rectangular tubing or the like. Each chute has a vertical leg 70a which extends from the ends of a pair of rails 60 and an integral leg 70b. A slot 71 is formed along the length of each chute to guidingly support portions of the articles being fed, such as the shanks of the clinch nuts 49. The portions 70b of the chutes may extend upwardly as shown, whereby the articles are elevated so that they can be introduced by gravity into the work machines. Alternately, the legs 70b may extend horizontally or in any other desired position.

An article drive assembly 75 is mounted on the frame 23 between the vertical and horizontal legs 70a, 70b, respectively, of the chutes 70 in order to push the articles along the legs 70b toward the work machines. In the preferred embodiment of the invention, the articles drive mechanism 75 comprises a magnetic drive wheel 76 for each chute. Each drive wheel 76 is formed by a pair of discs 77 (FIGS. 9 and 10) which are secured to a hub 78. A thin sheet of magnetic material 79, such as a barium ferrite and rubber composition or the like, is secured between the faces of the discs 77 by screws. The several magnetic drive wheels 76 are fixed on a rotatable shaft 80 which extends through the hubs 78. The ends of the rotatable shaft 80 are mounted in bearings 81 which are fastened to plates 82 by bolts 84. The plates 82 are secured to mounting brackets 85 which are in turn connected to the frame portions 56.

The shaft 80 and the connected magnetic drive wheels 76 are driven through a gear box 89 by a motor 90. The gear box 89 and the motor 90 are carried on a plate 91. The upper end of the plate 91 is pivotally connected to the bracket 85 by a shaft 92. At the lower end of the plate 91 where is provided an integral screw 93 which extends into the bracket 85. A nut 94 on the screw 93 serves to position the plate 91 and motor 90. The gear box 89 drives a sprocket 95 which is connected by a chain 96 to a driven sprocket 97 secured on the shaft 80. Since the magnetic drive wheels are mounted adjacent the chutes 70, actuation of the wheels serves to push the articles along the legs 70b to the work machines.

FIGURES 11 and 12 illustrate a modified magnetic drive construction 100 which can be used in place of the drive wheels 76. The modified embodiment 100 comprises a pair of drums 101 having center openings 102 for mounting of the drums on the shaft 80. A spacer disc 103 is mounted between the open ends of the drums 101 of each assembly 100 and this disc is provided with spaced apertures 104. Magnets 105 are mounted in the apertures 104 of the space disc 103 around the inside drums. The drums 101 and the interposed disc 103 are secured together by screws 106. In use, the modified magnetic drive structures 100 operate in substantially the same manner as the drive wheels 76 by engaging the workpiece articles and pushing them along the legs 70b of the chutes 70.

The combined operation of the various parts of the feeding apparatus of the invention will be largely apparent from the foregoing description. In summary, the conveyor belt 25 is acuated continuously to remove articles from the hopper 16 and transfer the articles to the pan portions 46 of both of the article orienting mechanisms 24. The vibrators 55 cause reciprocation of the article orienting mechanisms, thereby to align the articles deposited by the transfer mechanism in the pans 46 in aligned rows in the trough 48. The aligned articles are then moved along the troughs and onto the rails 60, as shown in FIG. 6. The articles which are thus moved to the ends of the rails 60 fall down the vertical legs 70b by actuation of the magnetic drive assembly 75.

Many other modifications and variations of the invention will be apparent to those skilled in the art in the light of the foregoing detailed disclosure. Therefore,

What is claimed is:
1. Article feeding apparatus comprising:
   (a) a hopper;
   (b) an article orienting mechanism above said hopper;
   (c) a feeding belt extending from within said hopper to above said orienting mechanism;
   (d) said orienting mechanism including:
      (i) a pan positioned to receive articles from said belt;
      (ii) said pan including spaced troughs;
      (iii) a pair of spaced rails aligned with each trough; and,
      (iv) means for vibrating said mechanism to feed articles along said troughs and aligned rails;
   (e) distributor means positioned to receive articles from said feeding belt and to distribute the articles on said pan;
   (f) a chute extending from the ends of each pair of rails and beyond said apparatus; and,
   (g) a magnetic drive wheel adjacent each chute for feeding articles therealong.

2. Article feeding apparatus comprising:
   (a) a hopper;
   (b) an article orienting mechanism above said hopper;
   (c) a feeding belt extending from within said hopper to above said orienting mechanism;
   (d) said orienting mechanism including:
      (i) a pan positioned to receive articles from said belt;
      (ii) said pan including spaced troughs;
      (iii) a pair of spaced rails aligned with each trough;
      (iv) a wiping plate positioned above said rails; and,
      (v) means for vibrating said mechanism to feed articles along said trough and said aligned rails;
   (e) a chute extending from the ends of each pair of rails and beyond said apparatus; and,
   (f) a magnetic drive wheel adjacent each chute for feeding articles therealong.

3. Article feeding apparatus comprising:
   (a) a hopper;
   (b) an article orienting mechanism;
   (c) article transfer means extending between said hopper and said orienting mechanism for transferring articles thereto;
   (d) said orienting mechanism including:
      (i) a first portion extending from said transfer means and having means for aligning articles in at least one row;
      (ii) a second portion with elongated article support means for receiving aligned articles from said first portion; and,
      (iii) means for reciprocating said portions to align articles in said first portion and then move the articles along said support means;
   (e) guide means extending from said support means, said guide means including a chute having a downwardly extending leg at an end of said support means; and,
   (f) article drive means mounted adjacent said guide means for moving articles therealong;
   (g) said article drive means including a magnetic drive member disposed at the bottom of said vertical leg, and means for actuating said drive member.

4. Apparatus as claimed in claim 3 wherein said drive wheel comprises a pair of ferromagnetic discs and a magnetic member between said discs.

5. Apparatus as claimed in claim 3 wherein said drive wheel comprises a drum, a spacer member held within said drum, and a plurality of magnets positioned around the inside of said drum by said spacer member.

6. Article feeding apparatus comprising:
   (a) means for defining a hopper;
   (b) an article orienting mechanism;
   (c) said mechanism including means for aligning articles in a plurality of rows, at least one of said rows being on a different side of said hopper than another of said rows;
   (d) article transfer means between said hopper and said orienting mechanism including a plurality of movable sloped projections for simultaneously transferring articles to said orienting mechanism from both sides of said hopper;
   (e) said article transfer means further including a stationary retaining section positioned adjacent to a portion of the path of motion of said projections for restraining said articles until they reach a position above said article orienting mechanism;
   (f) guide means extending from adjacent said orienting mechanism;
   (g) article drive means mounted adjacent said guide means; and,
   (h) means for actuating said drive means to move articles along said guide means.

7. Apparatus as claimed in claim 6 wherein said drive means comprises a magnetic wheel assembly.

8. A method of feeding articles such as clinch nuts and the like comprising the steps of:
   (a) transferring a plurality of articles from a storage location in which the articles are randomly disposed in unoriented relation;
   (b) said transferring step including moving and orienting the articles into alignment in a row;
   (c) gravity feeding articles in the row into a moving magnetic field at a first location;
   (d) guiding and supporting the row of articles for movement along a curved path in the magnetic field from the first location to a second location;
   (e) driving the magnetic field so that magnetic attraction moves the articles along the curved path from the first location to the second location;
   (f) and guiding and supporting the row of articles for movement from the second location to a location remote from the magnetic field so that articles in the row being magnetically moved along the curved path push other articles in the row from the second location to the remote location.

9. Article feeding apparatus comprising in combination:
   (a) guide structure along which articles such as clinch nuts and the like can be serially fed to a work machine;
   (b) means including an article hopper and an article orienting device adjacent to an end of said guide structure for receiving a quantity of articles and transferring the articles in aligned oriented relation onto said guide structure;
   (c) a magnetic drive wheel mounted adjacent said guide structure and spaced from said orienting device for urging said articles along said guide structure;
   (d) said wheel being mounted for rotation on an axis transverse to said guide structure;
   (e) said guide structure including a first portion which extends down from said orienting device to a first location closely adjacent to the periphery of the wheel so that articles are gravity fed from said orienting device to said wheel;
   (f) said guide structure including a second portion which extends beneath the periphery of the wheel and is curved around part of the periphery of said wheel from said first location to a second location spaced therefrom;
   (g) said wheel being rotatable about said axis so that the periphery of said wheel exerts a force through its magnetic attraction on said articles as it moves between said first and second locations; and, (h) said guide structure including a third portion extending beyond said wheel from said second location.

10. The apparatus as claimed in claim 9 wherein said third guide structure portion extends upwardly from said second location.

11. The apparatus as claimed in claim 9 in which said magnetic drive wheel comprises:
(i) a plurality of ferromagnetic disks;
(j) a shaft having a longitudinal axis coincident with said axis transverse to said guide structure;
(k) said ferromagnetic disks being mounted on said shaft;
(l) a motor for rotating said drive wheel;
(m) a sheet of magnetic material positioned between two of the ferromagnetic disks so as to rotate therewith.

12. The apparatus as claimed in claim 9 wherein said guide structure is comprised of side walls which are spaced apart to define a continuous slot in which portions of the articles are guidingly supported in proximity to the periphery of said wheel.

13. The apparatus as claimed in claim 12 wherein said orienting devices comprise wiper plate means which coact with the articles fed from said hopper to prevent improperly oriented articles from being transferred to said guide structure.

References Cited by the Examiner

UNITED STATES PATENTS

| | | |
|---|---|---|
| 2,552,029 | 5/1951 | Bludeau. |
| 2,588,085 | 3/1952 | Clouse _____ 198—41 |
| 2,910,165 | 10/1959 | Byington _____ 198—30 |
| 2,937,738 | 5/1960 | Albertoli _____ 198—33 |
| 3,164,269 | 1/1965 | Roosevelt _____ 198—41 X |

FOREIGN PATENTS 455,652    4/1949    Canada.

EVON C. BLUNK, *Primary Examiner.*

EDWARD A. SROKA, *Examiner.*